United States Patent [19]

Oda et al.

[11] 4,454,389
[45] Jun. 12, 1984

[54] LAMBDA TYPE DIRECT SUSPENDING OVERHEAD CONTACT SYSTEM FOR ELECTRIC RAILWAY

[75] Inventors: Osamu Oda, Machida; Hiroji Noda, Tokyo; Masaru Iwase, Yokohama; Yoshio Ishii, Tokyo, all of Japan

[73] Assignees: Japanese National Railway; Sanwa Tekki Corporation, both of Tokyo, Japan

[21] Appl. No.: 279,547

[22] Filed: Jul. 1, 1981

[30] Foreign Application Priority Data

Jul. 1, 1980 [JP] Japan .................................. 55-88547

[51] Int. Cl.³ ............................................. B60M 1/24
[52] U.S. Cl. .................................................. 191/43
[58] Field of Search ..................... 191/42, 43, 40, 41

[56] References Cited

U.S. PATENT DOCUMENTS 435,505  9/1890  Lieb ....................................... 191/42

FOREIGN PATENT DOCUMENTS 893503  7/1949  Fed. Rep. of Germany .
378565  5/1907  France .
573207  11/1923  France ................................. 191/41
1246165  1/1969  United Kingdom .

Primary Examiner—Richard A. Schacher
Attorney, Agent, or Firm—Oblon, Fisher, Spivak, McClelland & Maier

[57] ABSTRACT

A lambda type direct suspending overhead contact system for an electric railway including two or more pairs of anchor ears connected to a contact wire and outer and inner suspension wires held by a suspension clamp on a fixed beam at a ratio of a tensile of said outer suspension wire to a tensile of said inner suspension wire of 2.0 to 3.5:1.

5 Claims, 5 Drawing Figures

LAMBDA TYPE DIRECT SUSPENDING OVERHEAD CONTACT SYSTEM FOR ELECTRIC RAILWAY

BACKGROUND OF THE INVENTION

1. Field of the Invention

The present invention relates to a lambda type direct suspending overhead contact system for electric railway which is less costly than conventional systems.

2. Description of the Prior Art

Tests of aluminum wire having steel tape core have begun with the idea of using them instead of the conventional copper contact wire. Aluminum wire having steel tape core as a contact wire is made by encapsulation of a steel tape in aluminum and is referred to as steel-aluminum contact wire. The steel-aluminum contact wire can be suspended under high tension whereby it is possible to suspend it by lambda type suspension wires without using a messenger wire.

The lambda type suspension wire has anchor ears at both ends to hold a contact wire for a railway. The center of the suspension wire is held in lambda form by an insulator fitting connected to a fixed beam. It is, however, indispensable to bend the different catenaries formed at both sides of the anchor ear. The bent part of the catenaries of the contact wire, however, causes problems for high speed running of a car.

SUMMARY OF THE INVENTION

It is an object of the present invention to provide a lambda type direct suspending overhead contact system for electric railway which provides smooth catenaries of a contact wire at both sides of each anchor ear so as to allow for high speed running of a car.

The foregoing and other objects of the present invention have been attained by providing a lambda type direct suspending overhead contact system which comprises two or more pairs of anchor ears connected to a contact wire and outer and inner suspension wires held by a suspension clamp on a fixed beam at a ratio of the strength of said outer suspension wire to the tensile strength of said inner suspension wire of 2.0 to 3.5:1.

DETAILED DESCRIPTION OF THE PREFERRED EMBODIMENTS

Figure 1:
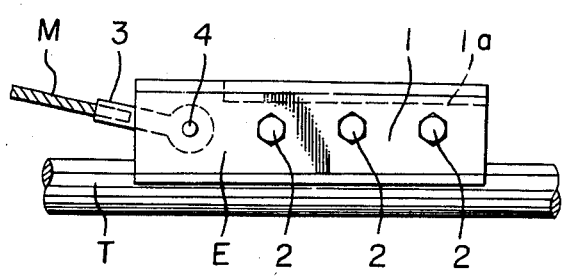
FIG. 1 is a front view of an anchor ear.
Figure 2:
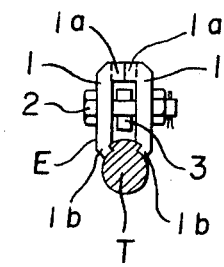
FIG. 2 is a side view of the anchor ear.

Referring to the drawings, one embodiment of the lambda type direct suspending overhead contact system for electric railway will be illustrated.

An anchor ear E is formed by a pair of slender ear plates (1). Each ear plate has a butt contact edge (1a) at the upper side and a clamp tooth (1b) for clamping a contact wire at the lower side and throughholes for fastening bolts (2) at a central part and a throughhole for a cotter bolt (4) at one end in the longitudinal direction. A connecting fitting (3) is pivotally fitted to the cotter bolt (4) and the other end of the connecting fitting (3) is fixed to the suspension wire M.

Two kinds of inner and outer suspension wires $M_1$ and $M_2$ are used and the anchor ears $E_1$, $E_1$ are connected to both sides of the inner suspension wire and the anchor ears $E_2$, $E_2$ are connected to both sides of the outer anchor ears. A contact wire T is clamped by the anchor ears $E_1$, $E_1$, $E_2$, $E_2$ and the inner and outer suspension wires are held at the center by an insulated clamp or fitting S held on each fitting beam.

If the tensile force applied to the inner and outer suspension wires $M_1$ and $M_2$ are equal, the tensile force applied to the contact wire inside of the anchor ears $E_2$, $E_2$ is lowered by the tensile strength of the inner suspension wire $M_1$ to be lower than the tensile strength of the contact wire outside of the anchor ears $E_2$, $E_2$. Therefore, the positions of the anchor ears $E_1$, $E_1$ connected to the inner suspension wire $M_1$ are pulled up to bend the contact wire at the positions of the anchor ears $E_1$, $E_1$ whereby proper straightening of the contact wire is not attained.

The positions for clamping the contact wire T by the anchor ears are selected to reach a ratio of the tensile force applied to the inner suspension wire $M_1$ to the tensile force applied to the outer suspension wire $M_2$ of 1:2.0 to 3.5 and the tensile force is adjusted by each turnbuckle B connected in the outer suspension wire $M_2$. If the tensile force applied to the inner and outer suspension wires is adjusted to said ratio, and bending of the contact wire T caused by the anchor ears is distributed to result in the substantially straightening of the contact wire.

The ratio of the tensile forces applied to the inner and outer suspension wires $M_1$, $M_2$ for substantially straightening the contact wire T can be easily calculated depending upon unit weights of the contact wire T, the tensile forces for suspension and the heights of the suspension wire from the contact wire.

Figure 4:
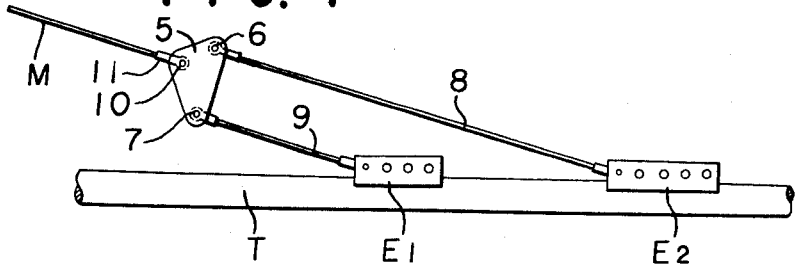
FIG. 4 is a partial front view of the other embodiment of the lambda type direct suspending overhead contact system of the present invention.

FIG. 4 shows the other embodiment of the same concept. Two subsuspension wires (8), (9) are respectively connected to pins (6), (7) fitted on both ends of a yoke (5). Each anchor ear $E_1$, $E_2$ is pivotally connected to each connecting fitting fixed to each of the outer and inner suspension wires (8), (9). A pin (10) is fitted at the other end of the yoke (5) at a suitable position to form triangle points (6), (7), (10). One end of the main suspension wire M is fixed to a connecting fitting (11) which is pivotally connected to the pin (10). Each anchor ear $E_1$, $E_2$ is connected to the other end of the subsuspension wire (8), (9) and the contact wire T is held by the anchor ears $E_1$ and $E_2$ at desired positions with desired spacing. The main suspension wire M is held on the supporting fitting S. The tensile force applied to the inner suspension wire (9) is previously adjusted to 1/2.0 to 3.5 time of the tensile force applied to the outer suspension wire (8) by selecting the position of the pin (10). The same result is attained only by holding the main suspension wire M on the supporting clamp S on the fixed beam.

In accordance with the present invention, the contact wire can be smoothly suspended near the anchor ears so as to be durable to high speed running of a car.

Figure 5:
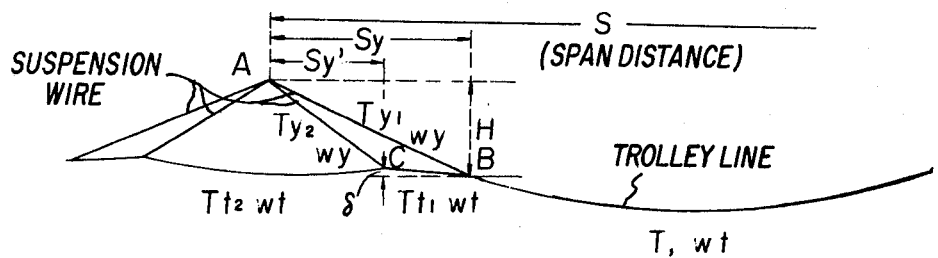
FIG. 5 is a schematic view of the suspending overhead contact system for calculation of tensile strength.

Referring to FIG. 5, the ratio of the tension force applied to the inner and outer suspension wires will be further illustrated.

In order to result in straightening of the contact wire T by suspending it at the positions C, B by the anchor ears connected to the suspension wires which are held at the point A, a suitable ratio of the tensile forces applied to the inner and outer suspension wires $T_{y1}$, $T_{y2}$ is given by the equations:

$$H = \frac{\frac{T_{t1}}{Sy - Sy'}\left(wy\frac{Sy + Sy'}{2} + wt\frac{S}{2}\right) + \frac{T_{y2}}{Sy'}\left(wy\frac{Sy}{2} + wt\frac{S - Sy - Sy'}{2}\right)}{\frac{T_{t1}}{Sy - Sy'}\left(\frac{T_{y1}}{Sy} + \frac{T_{y2}}{Sy'}\right) + \frac{T_{y1}T_{y2}}{Sy\,Sy'}} \quad (1)$$

$$\delta = H - \frac{\frac{T_{t1}}{Sy - Sy'}\left(wy\frac{Sy + Sy'}{2} + wt\frac{S}{2}\right) + \frac{T_{y1}}{Sy}\left(wy\frac{Sy'}{2} + wt\frac{Sy + Sy'}{2}\right)}{\frac{T_{t1}}{Sy - Sy'}\left(\frac{T_{y1}}{Sy} + \frac{T_{y2}}{Sy'}\right) + \frac{T_{y1}T_{y2}}{Sy\,Sy'}} \quad (2)$$

wherein:
H designates the vertical distance between the suspension clamp or fitting S and the outer pair of anchor ears $E_2$, $E_2$.
$\delta$ designates the vertical distance between the outer pair of anchor ears $E_2$, $E_2$ and the inner pair of anchor ears $E_1$, $E_1$.
S designates the span distance;
T, $T_{t1}$, $T_{t2}$ designate tensile forces applied to the contact wire at three ranges;
$T_{y1}$, $T_{y2}$ designate tensile forces applied to the outer and inner suspension wires;
wt designates the unit weight of the contact wire;
wy designates the unit weight of the suspension wires;
Sy designates the distance between the central point A to the position of the outer anchor ear $E_2$.

The distance Sy is usually in a range of 2 to 8 m preferably 3 to 5 m. The distance between the positions of the outer anchor ear and the inner anchor ear is preferably in a range of ½Sy (1±0.3).

When $T_{y1}$ is given, $T_{y2}$ is required to give $\delta$ for equal bending angles of the contact wire at B point and C point from the equations (1), (2).

In general, a ratio of $T_{y1}$ to $T_{y2}$ is in a range of about 2.0 to 3.5:1.

Figure 3:
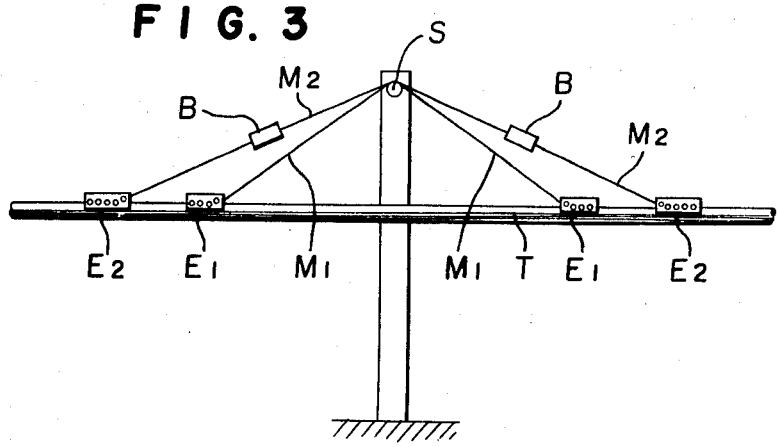
FIG. 3 is a front view of one embodiment of a lambda type direct suspending overhead contact system of the present invention.

This calculation can be used for both of the embodiments shown in FIGS. 3 and 4.

EXAMPLE the embodiment shown in FIG. 4 is applied for a trolley line.

| A. | Trolley line: | TA 150 | Tensile: | 1000 kgf |
|---|---|---|---|---|
| | Lambda type suspension fitting: | | Tensile: | 250 kgf |
| | Distance between suspending points: | | | 50 m |
| | Distance between trolley line and suspending point: | | | 325 mm |
| | Applicable speed: | under 120 km/hr (single anchor) | | |
| | | under 160 km/hr (double anchor) | | |
| | Operative life: | 4 times as much of GT trolley line | | |
| B. | Trolley line: | TA 150 | Tensile: | 1500 kgf |
| | Lambda type suspension fittings: | | Tensile: | 300 kgf |
| | Distance between suspending points: | | | 63 m |
| | Distance between trolley line and suspending point: | | | 335 m |
| | Applicable speed: | under 120 km/hr (single anchor) | | |
| | | under 160 km/hr (double anchor) | | |

The lambda type suspension unit includes the main suspension wire M, the outer and inner suspension wires (8), (9); the anchor ears $E_1$, $E_2$ and the yoke (5) comprising pins (6), (7), (10). The suspension unit is preassembled in one unit having an overall length of approximately 8 m and to facilitate the transit of this unit. This unit can be held in groups of four thus having the length of only 2 m. For installation of this unit, the unit is extended to its full length and is fitted to the trolley line by fixing the anchor ears at both ends and the suspension wire is connected to a suspension clamp at the center to a hook of a bracket.

We claim:
1. A lambda type direct suspending overhead contact system for an electric railway having a contact wire, comprising:
a fixed beam having a suspension clamp or fitting mounted thereon;
at least an outer pair and an inner pair of anchor ears connected to said contact wire; and
outer and inner suspension wires connecting said suspension clamp or fitting on said fixed beam to said outer and inner pairs of anchor ears, respectively, so as to have a ratio of the tensile force applied to said outer suspension wires to the tensile force applied to said inner suspension wires is between 2.0 to 1 and 3.5 to 1,
wherein said outer and inner suspension wires suspend said contact wire under the tensile forces provided by the equations:

$$H = \frac{\frac{T_{t1}}{Sy - Sy'}\left[wy\frac{Sy + Sy'}{2} + wt\frac{S}{2}\right] + \frac{T_{y2}}{Sy'}\left[wy\frac{Sy}{2} + wt\frac{S - Sy - Sy'}{2}\right]}{\frac{T_{t1}}{Sy - Sy'}\left[\frac{T_{y1}}{Sy} + \frac{T_{y2}}{Sy'}\right] + \frac{T_{y1}T_{y2}}{Sy\,Sy'}}$$

$$\delta = H - \frac{\frac{T_{t1}}{Sy - Sy'}\left[wy\frac{Sy + Sy'}{2} + wt\frac{S}{2}\right] + \frac{T_{y1}}{Sy}\left[wy\frac{Sy'}{2} + wt\frac{Sy + Sy'}{2}\right]}{\frac{T_{t1}}{Sy - Sy'}\left[\frac{T_{y1}}{Sy} + \frac{T_{y2}}{Sy'}\right] + \frac{T_{y1}T_{y2}}{Sy\,Sy'}}$$

wherein:
H designates the vertical distance between said suspension clamp or fitting and said outer pair of anchor ears;
$\delta$ designates the vertical distance between said outer pair of anchor ears and said inner pair of anchor ears;

Sy designates the horizontal distance between said suspension clamp or fitting and one of said outer pair of anchor ears;

Sy' designates the horizontal distance between said suspension clamp or fitting and one of said inner pair of anchor ears;

S designates the span distance;

T, $T_{t1}$, $T_{t2}$ designate the tensile forces applied to the contact wire at three ranges;

$T_{y1}$, $T_{y2}$ designate the tensile forces applied to the outer and inner suspension wires;

wt designates the unit weight of the contact wire; and wy designates the unit weight of the suspension wires, whereby said contact wire is supported so as to be substantially straight.

2. The lambda type direct suspending overhead contact system according to claim 1, wherein said at least two pairs of anchor ears further comprise a pair of outer anchor ears connected to said outer suspension wire and a pair of inner anchor ears connected to said inner suspension wire.

3. The lambda type direct suspending overhead contact system according to claim 1, further comprising turnbuckle means connected to at least one of said outer suspension wires for adjustment of the tensile force applied to said outer suspension wire.

4. The lambda type direct suspending overhead contact system according to claim 1, further comprising a main suspension wire supported by said suspension clamp and yoke means pivotally fitted to said main suspension wire and wherein said outer suspension wire further comprises an outer subsuspension wire and said inner suspension wire further comprises an inner subsuspension wire.

5. The lambda type direct suspending overhead contact system according to claim 1 wherein said contact wire further comprises aluminum wire having a steel tape core.

* * * * *